United States Patent [19]

Kanazawa et al.

[11] Patent Number: 5,362,951
[45] Date of Patent: Nov. 8, 1994

[54] MAGNETIC CARD READER EQUIPPED WITH HEAD REVERSING FUNCTION

[75] Inventors: Masahiro Kanazawa; Takeshi Miyashita, both of Yokohama, Japan

[73] Assignee: Amano Corporation, Kanagawa, Japan

[21] Appl. No.: 856,558

[22] Filed: Mar. 24, 1992

[30] Foreign Application Priority Data

Mar. 30, 1991 [JP] Japan .................... 3-092821

[51] Int. Cl.$^5$ .................... G06K 7/08; G06K 13/08
[52] U.S. Cl. .................... 235/449; 235/480
[58] Field of Search ........... 235/449, 380, 379, 480; 360/2

[56] References Cited

U.S. PATENT DOCUMENTS

| | | | |
|---|---|---|---|
| 3,836,753 | 9/1974 | Pass | 235/449 |
| 4,110,803 | 8/1978 | Townsend | 235/449 |
| 4,591,939 | 5/1986 | Nakarai et al. | 360/2 |

FOREIGN PATENT DOCUMENTS

63-324664 9/1990 Japan .

Primary Examiner—Donald Hajec
Assistant Examiner—Jeffrey R. Filipek
Attorney, Agent, or Firm—Stevens, Davis, Miller & Mosher

[57] ABSTRACT

A reversing board 14 with a magnetic head 16 mounted thereon is provided at its central portion with card guides 14b1, 14b2, the inlet ports of the card guides 14b1, 14b2 being disposed proximate to the front end openings of front and rear card guides 2A, 2B, the magnetic head 16 being biased by a compression spring 17S so that the head can be acted upwardly and downwardly, a positioning stopper 15 being engaged in a positioning groove 14a of the reversing board 14, a rotational tension force being exerted to a head reversing gear 12 by a tension spring 13S.

5 Claims, 6 Drawing Sheets

MAGNETIC CARD READER EQUIPPED WITH HEAD REVERSING FUNCTION

BACKGROUND OF THE INVENTION

1. Field of the Invention

This invention relates to a magnetic card reader equipped with a head reversing function utilized in the technical field of various kinds of devices and equipments which use a magnetic card, such as automatic fee adjustment device and automatic cash dispenser, and more particularly to a magnetic card reader equipped with a head reversing function, which is capable of reading and writing without any trouble even if a magnetic card is inserted in a wrong way with reference to upper and lower sides thereof or with reference to front and rear sides thereof.

2. Brief Description of the Prior Art

A general magnetic card used for various kinds of devices and instruments is formed on the right-hand side relative to an inserting direction with a magnetic stripe, so that when the magnetic card is inserted into an insertion slot of a card reader in accordance with an arrow which is marked on the upper surface of the magnetic card, a transport device transports this magnetic card along a card transport passageway. During the transportation, a magnetic head disposed on the right-hand side of the upper surface of the card transport passageway contacts the magnetic stripe in order to read and write magnetic information.

Accordingly, since the magnetic head cannot read and write the magnetic information unless the magnetic card is correctly inserted into the insertion slot in accordance with the arrow, etc., the magnetic card is rejected when it is inserted in a wrong way with respect to upper and lower sides thereof. At that time, a warning is issued by means of, for example, lamp, voice, etc. indicating a request for reinsertion of the magnetic card in its correct attitude.

However, it frequently occurs that a magnetic card is inserted in the wrong way particularly when it is too dark to recognize a correct way of insertion of the magnetic card or when the magnetic card must be inserted in a hurry by one reason or others. If it is required to reinsert the magnetic card by changing its inserting direction (from the rear side first to the front side first) and/or by correcting its side (from the lower surface up to the upper surface up) every time such wrong insertion occurs, it is indeed very time consuming and troublesome for those who use such magnetic cards. Therefore, it has been demanded a development of a magnetic card in which magnetic information can be correctly read and written irrespective of the inserting attitude (the insertion slot is designed to be wide in dimension when a magnetic card is to be inserted in a horizontal posture) of the magnetic card, i.e., whether the magnetic card is inserted from its front end first or not, or whether the card is inserted with its front surface up or not.

In view of the above situation, the applicant of the present invention has developed a magnetic card reader, as disclosed in the prior Japanese Patent Application No. Sho 63-324554, wherein four magnetic sensors adapted to judge whether a magnetic card is inserted with its front surface (upper surface) up or not, are mounted on both sides of the upper and lower surfaces of a card insertion slot, a card transport passageway for transporting a magnetic card inserted into the insertion slot being provided on both sides thereof each with a reversing board which can be reversed by a motor so that when a position of a magnetic head mounted on the reversing boards is not coincident with a position of the magnetic stripe of the inserted magnetic card, the reversing boards are reversed by the motor so that the magnetic head can correctly read and write magnetic information with respect to the magnetic stripe.

However, since the above-mentioned magnetic card reader is designed such that the magnetic head is mounted on the reversing board so as to be reversed, a front end opening of a card guide is required to be situated away from the mounting position of the magnetic head so that it would not interfere the reverse rotation of the magnetic head. Because of the foregoing reason, a gap between the card guide and the magnetic head is widened with the results that when a magnetic card in use is thin or bent, it tends to enter into this gap during its transportation. As a result, there occurs inferior read/write, or card clogging, or breakage of a magnetic card.

In addition, in the above-mentioned magnetic card reader, since the magnetic head is such designed as able to be reversed, the magnetic head is required to be fixed to the reversing board in order to maintain a gap or distance between a roller receiving the magnetic head and the magnetic head itself constant in dimension, in other words, in order to obtain a predetermined dimension of the insertion space for the magnetic card, so that read/write can be performed correctly. Since this design is unable to cope with a change in width of the magnetic card, it gives rise to such problem that only a magnetic card having a predetermined thickness is usable.

Moreover, in the above-mentioned magnetic card reader, a stop position of the reversing rotation of the magnetic head is achieved by means of braking function of the motor which rotates the reversing board. This gives rise to another problem that because of play caused by backlash of gears for transmitting rotation of the motor, rotational clearance, etc., the magnetic head is difficult to be always stopped in a predetermined position.

SUMMARY OF THE INVENTION

It is therefore an object of the present invention to provide a magnetic card reader equipped with a head reversing function, in which a magnetic head can smoothly and correctly read/write magnetic information with respect to a magnetic card irrespective of its attitude, i.e., whether the magnetic head faces upward or downward, a magnetic card having different kinds of thickness is usable, and a magnetic head, which is now in its reversed position, can always be stopped in a correct position.

To achieve the above object, there is essentially provided a magnetic card reader comprising four magnetic sensors mounted on both sides of upper and lower surfaces of a card insertion slot and adapted to judge whether a magnetic card is inserted with its front surface up or not, a reversing board mounted on each side of a card transport passageway for transporting a magnetic card inserted into the insertion slot and adapted to be reversed by a motor so that when a vertical attitude of a magnetic head mounted on said reversing board is not coincident with an attitude of said magnetic card inserted, said reversing board is reversed by the motor so that said magnetic head can correctly read and write magnetic information with respect to the magnetic stripe, wherein a magnetic card reader equipped with a head reversing function being characterized by:

(1) each of said reversing boards being provided in a side direction of a central portion thereof with a card guide and adapted to guide a side edge of said magnetic card, a front end opening of said card transport passageway for guiding inserted said magnetic card being disposed proximate to an inlet port of said card guide;

(2) each of said reversing boards being provided on one side with reference to said guide passageway with a head receiving roller and on the other side with reference to said guide passageway with a head support frame normally biased by a compression spring toward said head receiving roller, said magnetic head being mounted on said head support frame;

(3) said reversing board formed in a disc shape with said magnetic head mounted thereon, said reversing board being provided on a peripheral surface thereof with upper and lower grooves adapted to correctly position said magnetic head in an upwardly facing state and a downwardly facing state, a positioning stopper formed of a plate spring being engaged in each of said grooves;

(4) a head reversing gear adapted to transmit rotation of a motor to said reversing board being provided with a tension spring adapted to exert such a controlled amount of unidirectional rotational force to said head reversing gear as being able to prevent said positioning stopper from being disengaged from said positioning groove formed in said reversing board.

A magnetic card reader equipped with a head reversing function thus constituted functions as follows.

①  By virtue of the feature that the card guide is mounted on the reversing board itself with the magnetic head mounted thereon as in the above (1), the magnetic card transported along the transport passageway is continuously guided by the card guide so as not to be escaped sideward. Accordingly, the magnetic head can correctly read/write magnetic information with respect to the magnetic card. As a result, even a thin magnetic card and/or a bent magnetic card is usable without any trouble.

②  By virtue of the feature that the magnetic head can be freely worked or acted upward and downward owing to bias of the compression spring so that a distance between the magnetic head and the head receiving roller would be variable depending on the thickness of the magnetic card as in the above (2), even a magnetic card having different thickness is usable.

③  By virtue of the feature that the rotation of the reversing board with the magnetic head mounted thereon can be stopped in a predetermined position by the stopper engaged in the positioning groove as in the above (3), the magnetic head can always be correctly stopped in an upwardly facing position or a downwardly facing position, so that the magnetic head can correctly read/write magnetic information with respect to the magnetic card.

④  By virtue of the feature that a controlled amount of unidirectional rotational force is normally exerted to the head reversing gear by means of the function of the tension spring as in the above (4), this rotational force is well balanced with the engaging force of the stopper with respect to the positioning groove. As a result, the head reversing gear can be stopped in a predetermined position. Accordingly, a positional accuracy of the magnetic head can be enhanced by obviating play caused by the rotational clearance and backlash.

As seen in the foregoing, the technical problems inherent in the prior art device can be solved by the present invention.

The above and other objects and novel features of the present invention will become more manifest to those skilled in the art as the description proceeds when considered in connection with the accompanying drawings.

DETAILED DESCRIPTION OF THE EMBODIMENT

One preferred embodiment of a magnetic card reader equipped with a head reversing function according to the present invention will be described in great detail with reference to the accompanying drawings.

Figure 1:
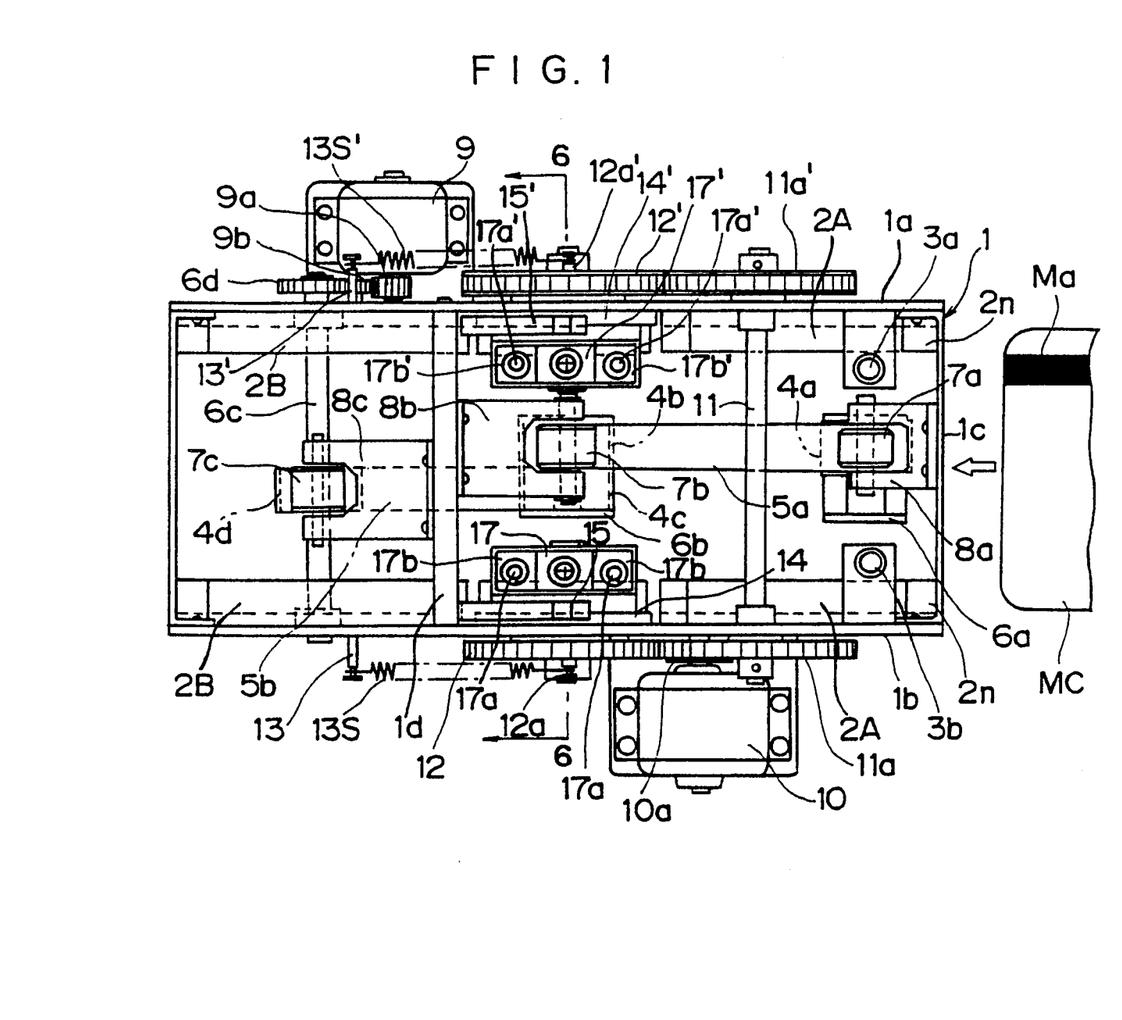
FIG. 1 is a plan view showing an important portion of a magnetic card reader according to one embodiment of the present invention.
Figure 2:
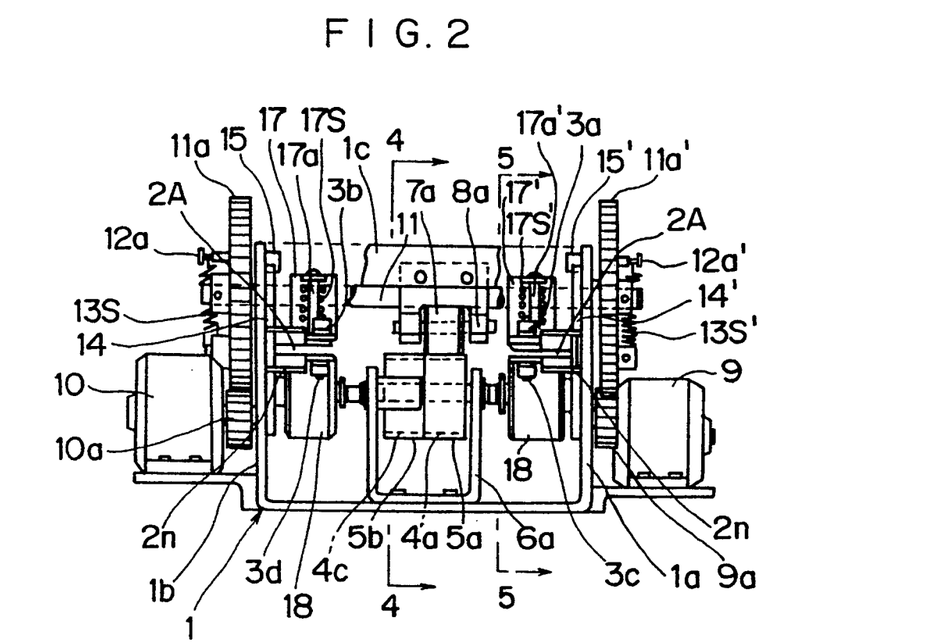
FIG. 2 is a front view thereof.
Figure 3:
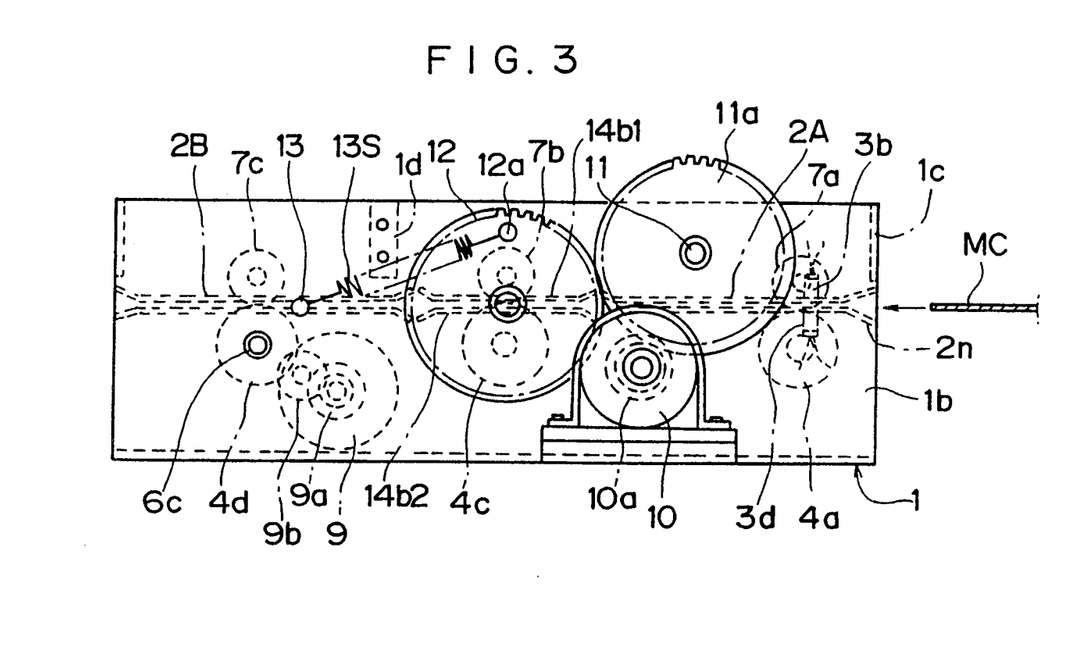
FIG. 3 is a side view thereof.
Figure 4:
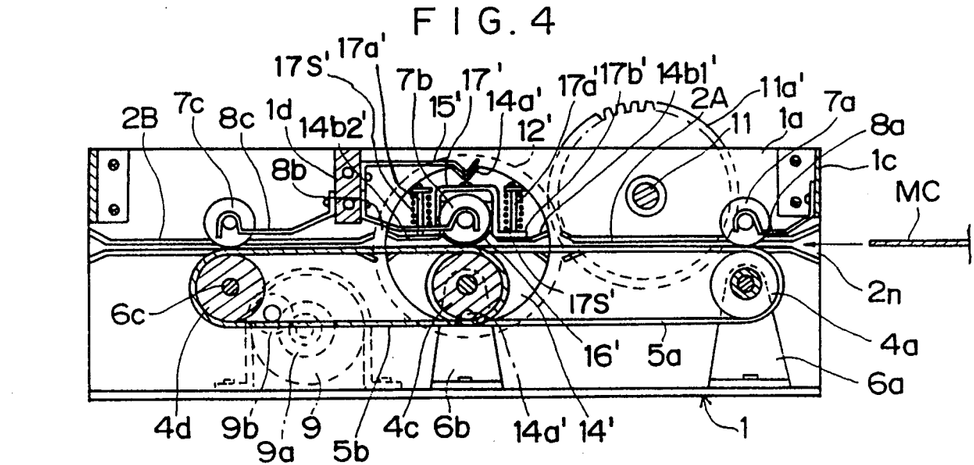
FIG. 4 is a sectional view taken on line 4—4 of FIG. 2.
Figure 5:
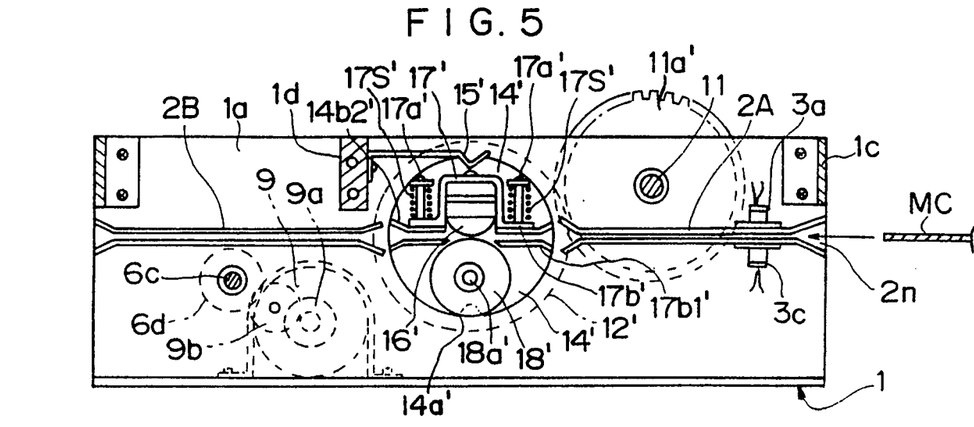
FIG. 5 is a sectional view taken on line 5—5 of FIG. 2.
Figure 6:
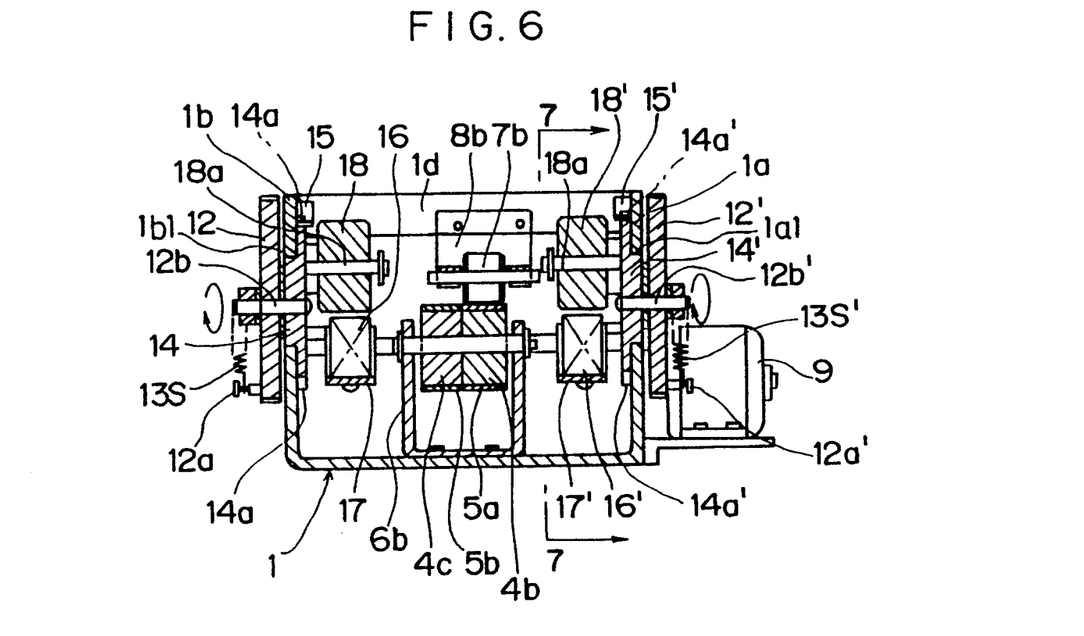
FIG. 6 is a sectional view taken on line 6—6 of FIG. 1, showing a reversed state of the magnetic head.
Figure 7:
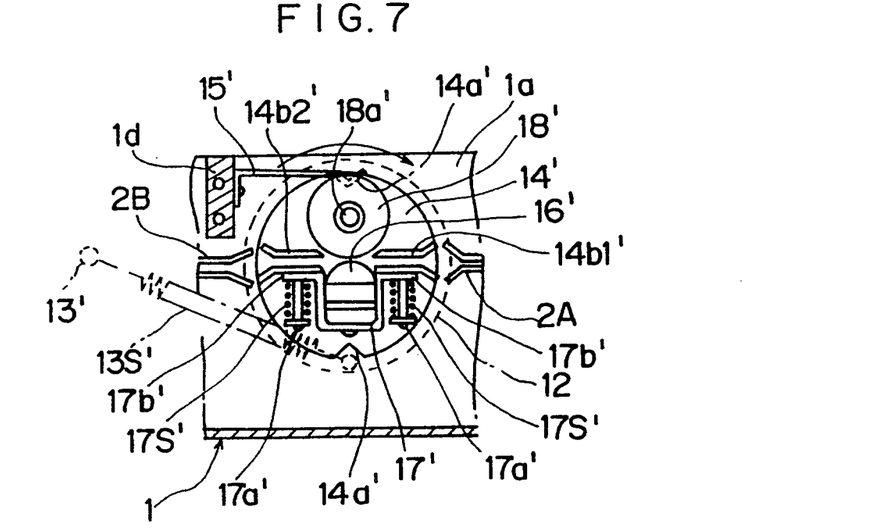
FIG. 7 is a sectional view of an important portion taken on line 7—7 of FIG. 6.

FIG. 1 is a plan view of a magnetic card reader according to the present invention, FIG. 2 is a front view thereof, FIG. 3 is a side view thereof, FIGS. 4 and 5 are sectional views taken on lines 4—4 and 5—5 of FIG. 2, FIG. 6 is a sectional view taken on line 6—6 of FIG. 1, showing a reversed state of a magnetic head, and FIG. 7 is a sectional view taken on line 7—7 of FIG. 6, showing an important portion of such reversed magnetic head. In these Figures, the numeral 1 denotes a main frame of the magnetic card reader, and 1a, 1b respectively denote right and left sideboards thereof. The reference numerals 2A, 2A' and 2B, 2B' respectively denote card guides which are mounted on front and rear parts of inner surfaces of the sideboards 1a, 1b in opposite relation. Between the front card guides 2A, 2A' and the rear card guides 2B, 2B' is formed a space for mounting a magnetic head which will be described hereinafter. The reference numerals 2n, 2n' respectively denote card insertion slots acting as inlet ports for the front card guides 2A, 2A.

Next, the reference numerals 1c, 1d respectively denote mounting plates disposed slightly rearward from the inlet portion and intermediate portion of the sideboards 1a, 1b. The inlet mounting plate 1c is provided with an inlet tension roller 7a mounted thereon through a plate 8a for supporting a spring, and the intermediate mounting plate 1d is provided with an intermediate tension roller 7b and a rear tension roller 7c which are mounted on front and rear surfaces thereof likewise through plates 8b, 8c for supporting the springs.

The reference numerals 3a, 3b, 3c, and 3d respectively denote first through fourth magnetic sensors which are mounted on upper surfaces of the right and left sides, and on lower surfaces of the right and left sides of the insertion slot for a magnetic card MC in vertical opposite relations, respectively, and which are adapted to judge whether the surface under judgment is a front surface side or a back (lower) surface side of the magnetic card MC. When the magnetic card MC is inserted with its magnetic stripe Ma formed of a magnetic tape placed on the right-hand side of its upper surface as shown in FIG. 1, the first magnetic sensor 3a now at an upper part of the right-hand side in FIG. 2 detects the magnetic stripe Ma and judges that the magnetic card MC is inserted with the front surface up. Similarly, when the magnetic card MC is inserted with its magnetic stripe Ma placed on the left-hand side of its upper surface, the second magnetic sensor 3b now at an upper part of the left-hand side in FIG. 2 detects the magnetic stripe Ma and judges that the magnetic card MC is inserted with the front surface up. On the other hand, when the magnetic card MC is inserted with the magnetic stripe Ma down, the lower third or fourth sensor 3c or 3d detects the magnetic stripe Ma and judges that the magnetic card MC is inserted with its back (lower) surface up.

When the first and fourth magnetic sensors 3a, 3d at an upper part of the right-hand side and at a lower part of the left-hand side in FIG. 2 detect the magnetic stripe Ma, they judge that the magnetic card MC is inserted with its front end first. Similarly, when the second and third magnetic sensors 3b, 3c at an upper part of the left-hand side and at a lower part of the right-hand side in FIG. 2 detect the magnetic stripe Ma, they judge that the magnetic card MC is inserted with its rear end first. In this way, the sensors can correctly judge the current Ma position of the inserted magnetic card MC. Therefore, irrespective of the Ma position of the inserted magnetic card MC, a magnetic head can correctly read and write magnetic information with respect to the magnetic stripe Ma as will be described in greater detail.

Next, the reference numerals 4a, 4b and 4c, 4d respectively denote conveyor rollers mounted on bearing frames 6a, 6b which are respectively disposed at an inlet portion and at a central portion of the main frame 1, and on a rotary shaft 6c disposed at a rear part of the main frame 1. Conveyor belts 5a, 5b are respectively disposed between the roller 4a at the inlet portion and the roller 4b at the central portion and between the roller 4c at the central portion and the roller 4d at the rear part. The arrangement being such that when the rotary shaft 6c is rotated by the card transport motor 9 which is mounted on the outer side of the main frame 1, the rear conveyor belt 5b is transferred first, and then, the front conveyor belt 5a is rotated in association thereto in order to transport the inserted magnetic card MC in the left direction in FIG. 1 with the inserted magnetic card MC sandwiched between the tension rollers 7a, 7b, 7c. Then, the magnetic card MC is directly transported in the left direction after being read and written by the magnetic head as will be described, or the card MC is sent back to the insertion slot 2n by reverse rotation of the card transport motor 9.

In the drawings, the reference numeral 9a denotes a driving gear of the card transport motor 9, and 9b denotes an operatively connected gear disposed between and meshed with the rotary gear 6d mounted on the rotary shaft 6c and the driving gear 9a.

The numeral 10 denotes a motor mounted on the outer side of the main frame 1 and adapted to reverse the magnetic head. The numeral 10a denotes a driving gear for motor 10, and numeral 11 denotes a shaft disposed between the sideboards 1a and 1b and adapted to reverse the head. One of operatively connected gears 11a, 11a' mounted on both ends of this reversing shaft 11 is caused to mesh with the driving gear 10a and the gears 11a, 11a' are in turn meshed with head reversing gears 12, 12' which are rotatably mounted on outer surfaces of the sideboards 1a, 1b at central portions thereof, so that when the motor 10 rotates, the head reversing gears 12, 12' on both sides are also cooperatively rotated in the same direction.

The numerals 14, 14' respectively denote reversing boards rotatably received in receiving holes 1a1 and 1b1 which are formed in central portions of the sideboards 1a, 1b. In FIG. 6, the reference numerals 12b, 12b' respectively denote mounting shafts on which the reversing boards 14, 14' and the head reversing gears 12, 12' are concentrically integrally mounted thereon, and 14a, 14a' respectively denote vertical positioning grooves each formed in a generally V-shape in section on the peripheral surface of each of the reversing boards 14, 14'. The grooves 14a, 14a' are located in a vertical symmetrical plane on a center line passing the mounting shafts 12b, 12b'. The numerals 15, 15' respectively denote positioning stoppers each formed of a plate spring mounted on the intermediate mounting plate 1d. Front ends of the respective stoppers 15, 15', which are each formed in a generally V-shape, are caused to resiliently pressurize the peripheral surface of each of the reversing boards 14, 14' and engage in the corresponding positioning grooves 14a, 14a' to thereby correctly position the reversing boards 14, 14'.

The reference numerals 14b1, 14b2 respectively denote card guides mounted on the inner surfaces of the reversing boards 14, 14' in such a manner as to pass across the central portions of the inner surfaces of reversing boards 14, 14'. The card guides 14b1 and 14b2 are spaced apart with respect to each other to form a space therebetween just enough to mount the magnetic head therein as will be described hereinafter. These card guides 14b1 and 14b2 are always located on a straight line interconnecting the card guides 2A and 2B irrespective of the direction of rotation of the reversing boards 14, 14', so that the magnetic card MC guided by the front card guides 2A, 2A would be continuously transported to the rear card guides 2B, 2B. The back end and front end openings of the card guides 2A and 2B respectively, are disposed proximate to the inlet and outlet ports of the card guides 14b1 and 14b2, so that the transported magnetic card MC would not escape from the guide way.

The numerals 17, 17' denote heads supporting frames vertically workably mounted on one side (upper side in FIG. 5) of the inner surface of each of the reversing boards 14, 14' with the card guides 14b1 and 14b2, and the numerals 16, 16' denote magnetic heads, one mounted on each of the head supporting frames 17, 17'. The reference numerals 17a, 17a and 17a', 17a' respectively denote guide shafts upstanding from the aforementioned card guides 14b1 and 14b2. Actually, the head supporting frames 17, 17' are vertically workably mounted on the inner surface of the reversing boards 14, 14' by thrusting the guide shafts 17a', 17a' into guide holes (not shown) formed in leg plates 17b, 17b thereof and biased by the compression springs 17S', 17S' mounted on the guide shafts 17a', 17a' to cause the magnetic head 16' to be projected into an intermediate portion between the card guides 14b1 and 14b2.

The numeral 18' denotes a head receiving roller mounted on the other side (lower side in FIG. 5) of the inner surfaces of the reversing boards 14, 14' using a mounting shaft 18a' with the card guides 14b1, 14b2 sandwiched therebetween. A head face of the magnetic head 16' is caused to be projected to the neighborhood of the peripheral surface of the head receiving roller 18' by the bias of the compression spring 17S', so that the head face of the magnetic head 16' would be urged against the magnetic stripe Ma on the transported magnetic card MC in order to correctly read and write the magnetic information.

In the drawings (FIGS. 6 and 7), the reference numerals 13S, 13S' respectively denote tension springs disposed between fixing pins 12a, 12a' on the head reversing gears 12, 12' and fixing pins 13, 13' projecting from the sideboards 1b, 1a, respectively. These springs 13S, 13S exert such a controlled amount of unidirectional rotational force to the head reversing gears 12, 12' as to prevent the positioning stoppers 15, 15' from being disengaged from the positioning groove 14, 14' so that play caused by rotational clearance and backlash of the gears would be obviated in order to stop the magnetic heads 16, 16' in a predetermined position.

Figure 8:
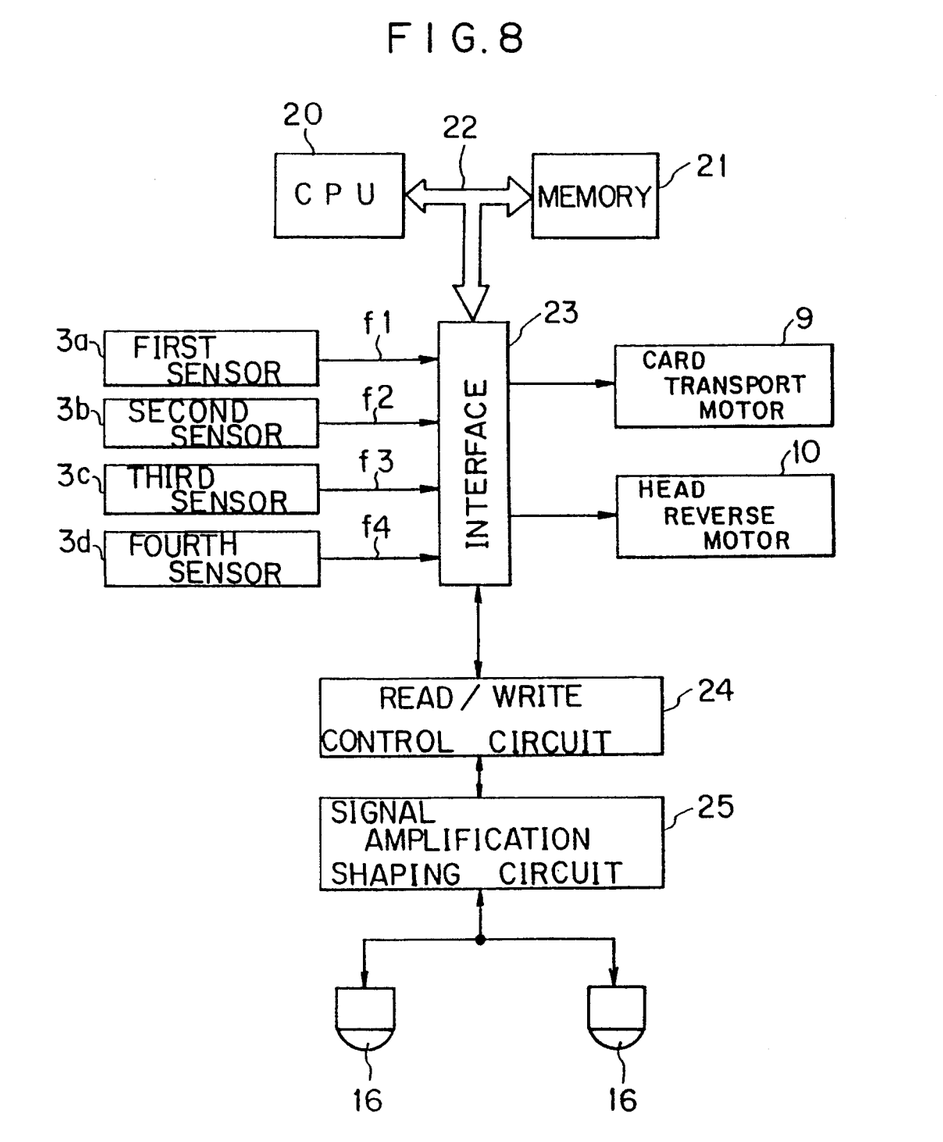
FIG. 8 is a block diagram showing an electric constitution of the present invention.

Next, FIG. 8 is a block diagram showing an electric constitution of the above-mentioned magnetic card reader according to the present invention. In the Figure, the numeral 20 denotes a CPU, and 21 denotes a memory comprising a ROM in which a system program is stored and a RAM for storing various kinds of magnetic data. An interface 23 connected between the CPU 20 and the memory 21 through a bus is connected with the afore-mentioned first through fourth magnetic sensors 3a, 3b, 3c, and 3d, the card transport motor 9, and the head reversing motor 10. The arrangement being such that when a detection signal f1 or f2 is sent from the first or second magnetic sensor 3a or 3b, the right and left magnetic heads 16, 16 are set into normal positions where the heads are facing downward as shown in FIGS. 4 and 5, and when a detection signal f3 or f4 is sent from the third or fourth magnetic sensor 3c or 3d, the head reversing motor 10 is driven to rotate the right and left magnetic heads 16, 16 by a half turn, so that the heads face upward.

Similarly, in FIG. 8, the numerals 24 and 25 respectively denote a read/write control circuit and a signal amplifying and shaping circuit connected between the right and left magnetic heads 16, 16 and the interface 23. The right and left magnetic heads 16, 16 read and write magnetic information with respect to the magnetic stripe Ma of the magnetic card MC through the circuits 24, 25 under the supervision of the CPU 20. On the other hand, by virtue of the above-mentioned circuit constitution, when the detection signals f1, f4 are received from the first and fourth magnetic sensors 3a, 3d, the right and left magnetic heads 16, 16 normally effect the read/write of the magnetic information starting first from a front portion side of the magnetic stripe Ma, and when the detection signals f2, f3 are received from the second and third magnetic sensors 3b, 3c, the right and left magnetic heads 16, 16 effect the read/write in a reverse way starting first from the tail of the magnetic stripe Ma, thus enabling to correctly read and write the magnetic information even if the magnetic card MC is inserted up side down or front side rear by mistake.

Since the magnetic card reader according to the present invention is such constituted as mentioned above, the magnetic information can be correctly read and written irrespective of the attitude of the magnetic card MC when being inserted. Furthermore, since the reversing board 14 having the magnetic head 16 mounted thereon is provided with the card guides 14b1, 14b2 and since the inlet ports of the card guides 14b1, 14b2 are disposed proximate to the front end openings of the front and rear card guides 2A, 2B, the magnetic card MC can be transported without being escaped from the guide way. Moreover, since the magnetic head 16 is biased by the compression springs 17S, 17S, the distance between the magnetic head 16 and the head receiving roller 18 is adjusted depending on the thickness of the magnetic card MC, thus enabling to cope with the variation in thickness of the magnetic card MC. At the same time, when the reversing board 14 with the magnetic head 16 mounted thereon is reversely rotated, the stopper 15 is brought into engagement with the positioning groove 14a, thereby to correctly face the magnetic head 16 downward or upward. Furthermore, since the reversing gear 12 is normally pulled by the tension spring 13S in one direction, play of the reversing board 14 caused by rotational clearance and backlash can be prevented, thus stopping the magnetic head 16 always in a predetermined position.

As described in the foregoing, according to the magnetic card reader of the present invention, magnetic information can be correctly read and written irrespective of the Ma positioning of the magnetic card when being inserted. On the other hand, the magnetic card can be correctly transported without being escaped from the guide way. Moreover, since the distance between the magnetic head and the head receiving roller is automatically adjusted depending on the thickness of the magnetic card, even a magnetic card having a different thickness or even a thin and bent magnetic card can be used without any trouble. Furthermore, since the magnetic head can always be stopped in a predetermined position, an inferior read/write occurrable to a reversing magnetic head can be obviated. Therefore, the present invention can be suitably applied to a card reader portion of various devices and instruments including an automatic fee adjustment device.

While a specific embodiment of the present invention has been shown and described in detail to illustrate the application of the principles of the invention, it will be understood that the invention may be embodied otherwise without departing from such principles.

What is claimed is:

1. A magnetic card reader comprising a frame having two sides to define a magnetic card passageway through which a magnetic card having a magnetic stripe along an edge thereof may pass through, two magnetic sensors mounted on said frame on an upper side of said passage way and two magnetic sensors mounted on said frame on a lower side of said passageway to determine the position of the magnetic stripe on said magnetic card passing through, reversing boards rotatably mounted on said frame each carrying a magnetic head which to correctly read and write magnetic information from said magnetic stripe of said magnetic card must coincide with said magnetic stripe, means to rotate said reversing board to render said magnetic head coincident with said magnetic stripe and a positioning stopper mounted on said frame wherein each said reversing board is in the form of a disc having two grooves on the periphery thereof diametrically opposed to each other into which said positioning stopper seats to position the magnetic head with respect to the magnetic stripe of said magnetic card.

2. The magnetic card reader of claim 1 including a tension spring adapted to exert a controlled amount of unidirectional force to said means for rotating each said reversing board so as to prevent said positioning stopper from disengaging with said groove.

3. The magnetic card reader of claim 1 wherein said positioning stopper is a plate spring.

4. A magnetic card reader comprising a frame having two sides to define a magnetic card passageway through which a magnetic card having a magnetic stripe along an edge thereof may pass through, two magnetic sensors mounted on said frame on an upper side of said passage way and two magnetic sensors mounted on said frame on a lower side of said passageway to determine the position of the magnetic stripe on said magnetic card passing through, reversing boards rotatably mounted on said frame each carrying a magnetic head which to correctly read and write magnetic information from said magnetic stripe of said magnetic card must coincide with said magnetic stripe and means to rotate said reversing board to render said magnetic head coincident with said magnetic stripe and each of said reversing boards carrying in addition to said magnetic head a card guide and a head receiving roller on the same side of the board, said card guide positioned to receive said magnetic card passing between said magnetic head and said roller.

5. The magnetic card reader of claim 4 including biasing means on each of said reversing boards to bias said magnetic head toward said head roller.

* * * * *